(No Model.)
A. WALES.
PIPE ORGAN.
No. 324,437. Patented Aug. 18, 1885.
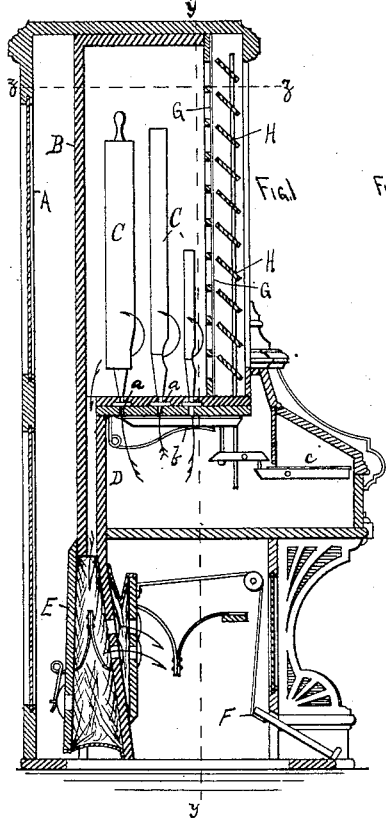
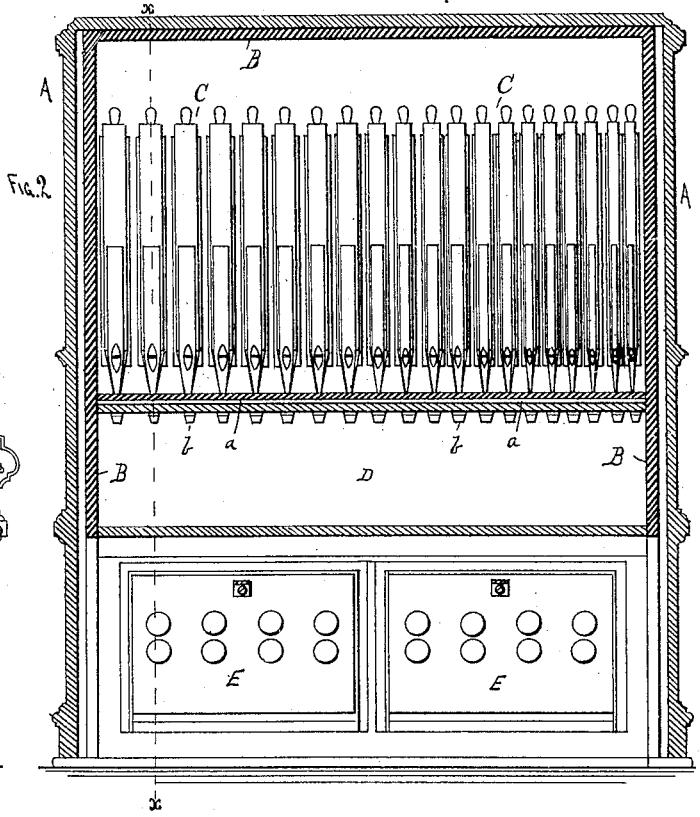
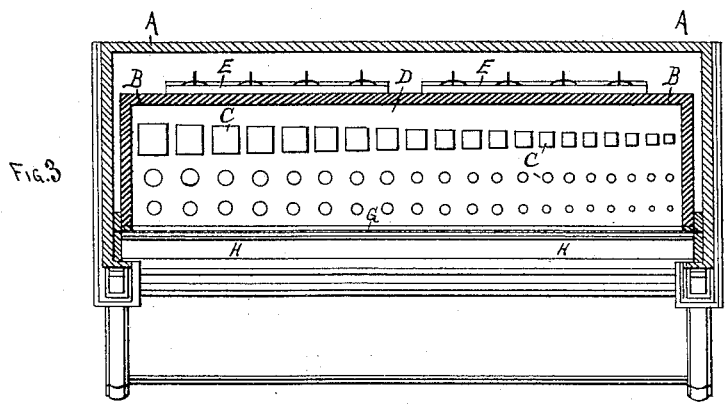
WITNESSES
Philip Wales.
Louis Fraser Jr.
Arthur Wales,
INVENTOR By
Louis Fraser & Leo. Attys.
N. PETERS. Photo-Lithographer, Washington, D. C.

Mir

UNITED STATES PATENT OFFICE.

ARTHUR WALES, OF MINNEAPOLIS, MINNESOTA.

PIPE-ORGAN.

SPECIFICATION forming part of Letters Patent No. 324,437, dated August 18, 1885.

Application filed April 15, 1884. (No model.)

*To all whom it may concern:*

Be it known that I, ARTHUR WALES, a citizen of the United States, and a resident of Minneapolis, in the county of Hennepin, in the State of Minnesota, have invented certain new and useful Improvements in Suction-Draft Pipe-Organs, of which the following specification is a full, clear, and exact description, reference being also had to the accompanying drawings, in which—

Figure 1 is a sectional side elevation on the line $x\ x$ of Fig. 2. Fig. 2 is a front view in section on the line $y\ y$ of Fig. 1. Fig. 3 is a plan view in section on the line $z\ z$ of Fig. 1.

This invention consists in an air-tight box or casing in which a series of organ-pipes are so arranged that all the air entering the casing must pass through the pipes, and means for exhausting the air from the casing to form a vacuum into which the outside air will rush through the pipes and sound them.

The invention further consists in the construction and arrangement of the valves, keys, swells, registers, bellows, &c., by which the pipes are controlled and sounded, substantially as hereinafter described, and then sought to be specifically defined by the claims.

In the drawings, A represents the outer casing of the organ, made in any desired ornamental form, and having an inner air-tight casing, B. The latter will be formed of any suitable material that will resist the passage of air, and will be supplied in its interior with a series of organ-pipes, C, opening out into the outer casing, A, through the air-tight casing B, as shown. By this means all the air which enters the casing B must pass through these pipes C.

That part of the casing B through which the pipes C pass is provided with the usual register-valves, $a$, by which the air passing into the pipes may be shut off or controlled; and the pipes are also provided with valves $b$, controlled by the usual keys, $c$, by which the instrument may be played upon.

Leading downward from the rear of the casing B is a tube, D, ending in an exhaust-bellows, E, adapted to be operated by a foot-treadle, F, in the ordinary manner of a "cabinet" or "reed" organ. By means of this bellows the air will be exhausted from the casing B and form a vacuum therein into which the outside air rushes through the pipes C when the valves and registers are opened, and thus sounds the pipes. The casing B will be usually formed of wood, which can be made perfectly air-tight, while at the same time it will not retard the sound to a degree sufficient to prevent the tones of the pipes being heard; but any other suitable material may be used to form the casing.

This form of organ will only be used in small rooms, where a soft muffled tone is the most desirable; but if a louder tone is desired a thin diaphragm, G, of rubber cloth or other similar material will be arranged to form part of the casing B, usually the front, through which the sounds will pass more freely. A set of swell-shutters, H, may also be arranged in front of the diaphragm G, adapted to be opened and closed by a suitable knee-swell to still further control the sound. The diaphragm G will be supported by a light open framework, which will firmly support the cloth, while at the same time not retarding the sounds. If preferred, the swell-shutters H may be arranged inside the casing B in the rear of the diaphragm G, and the frame-work which supports the latter formed in a fancy-scroll pattern to add ornament to its utility.

The pipes C are shown arranged in three rows; but may be arranged in any other desired manner and in any required number.

I claim many advantages by this manner of arranging and operating the pipes.

First. A reduced cost of construction, especially in the bellows, as a suction-bellows is very much more simple in construction than a pressure-bellows. The valves and other parts of the "action" can be formed with fewer parts, and consequently will be less liable to get out of order and will be much more easily repaired.

Second. An improved tone is imparted to the pipes, as, by drawing away the air into the bellows, all the mechanical and whistling noises are conveyed into the bellows and are not heard outside the organ.

Third. The pipes are protected from dust and dirt, as any dust which may be drawn in with air will be drawn out again by the bellows and not allowed to settle upon the pipes, as in the ordinary pressure-bellows organs.

Fourth. It requires less force to operate the action of the pedals and keys, thereby rendering it much more easy to play the instrument.

Under some circumstances the pipes might be arranged horizontally, or a portion of them horizontal and a portion upright.

Having described my invention and set forth its merits, what I claim is—

1. An air-tight casing, a series of organ-pipes within said casing, an opening for admitting air into said casing through said pipes, and an exhaust bellows or pump for drawing the air from said casing, substantially as and for the purpose set forth.

2. An air-tight casing, a diaphragm of rubber cloth or other similar suitable material forming part of said casing, a series of organ-pipes within said casing, an opening for admitting air into said casing through said pipes, and an exhaust bellows or pump for drawing the air from said casing, substantially as and for the purpose described.

3. The combination of the air-tight casing B, pipes C, exhaust-bellows E, valves $b$, and keys $c$, substantially as shown.

4. The combination of the air-tight casing B, having the diaphragm G, pipes C, exhaust-bellows E, valves $b$, and keys $c$, substantially as described.

5. The combination of the air-tight casing B, pipes C, exhaust-bellows E, valves $b$, registers $a$, and keys $c$, substantially as set forth.

6. The combination of the casing B, having the diaphragm G, pipes C, exhaust-bellows E, and swell-shutters H, substantially as and for the purpose specified.

In testimony whereof I have hereunto set my hand in presence of two subscribing witnesses.

ARTHUR WALES.

Witnesses:
PHILIP WALES,
C. N. WOODWARD.